UNITED STATES PATENT OFFICE.

FREDERICK GARDNER COTTRELL, OF BERKELEY, CALIFORNIA, ASSIGNOR TO INTERNATIONAL PRECIPITATION COMPANY, OF LOS ANGELES, CALIFORNIA, A CORPORATION OF CALIFORNIA.

FILTERING MEDIUM AND PROCESS FOR MAKING THE SAME.

1,060,065.      Specification of Letters Patent.      Patented Apr. 29, 1913.

No Drawing. Application filed November 24, 1908, Serial No. 464,270. Renewed September 30, 1912. Serial No. 723,241.

*To all whom it may concern:*

Be it known that I, FREDERICK GARDNER COTTRELL, a citizen of the United States, residing at Berkeley, in the county of Alameda and State of California, have invented certain new and useful Improvements in Filtering Media and Processes for Making the Same, of which the following is a specification.

My invention relates to filtering media and methods of preparing them, especially adapted for gases which carry acid substances either as gas, or as suspended particles, such, for example, as are produced in the smeltering of sulfid ores. These gases, whether they come from blast, reverberatory or roasting furnaces invariably carry suspended particles which, besides often representing very considerable values in the metals they contain, are also injurious to plants and animals; and much effort has been expended upon processes for the removal of such particles, with the result that for certain classes of these gases practical processes of filtration have been worked out. These processes may, for convenience, be roughly classified under two general heads— 1. Those in which a woven textile fabric, say of cotton, wool or asbestos is used; the term woven is to be understood as generic throughout this specification and claims, including knit, braided, twilled, etc. 2. Those employing filtrating beds of granular or fibrous material such as coke, sand, cinders, cotton waste, excelsior, etc. When the first type of filtration can be employed it is possible to treat very much larger quantities of suspended matter for the same labor and expense than in the case of the second type; but many gases are so corrosive that no textile fabric has yet been found which will resist their chemical action sufficiently to make its use economically practical on a large scale. As illustrations of these two methods of filtration may be cited, on the one hand, the bag houses now so generally used in connection with blast furnace gases of typical lead smelters, and on the other hand, the filter beds of coke and sand used in the contact sulfuric-acid process. The gases from lead furnaces may often be maintained sufficiently low in sulfuric-acid to permit the use of cotton bags, and when the safe limit for these is only slightly exceeded, woolen bags may still be used. With increasing acid content and elevation of temperature, however, even this limit is soon reached, so that for typical "roaster" gases, for example, their life is too short to render them of any commercial significance. Asbestos fabrics and fine wire cloth have both been tried; but the former soon hardens and becomes brittle under the conditions usually prevailing; and the latter when fine enough to be effective becomes prohibitively expensive, more especially as even its life is also limited. For convenience, I shall use the term corrosive gases to designate such gases as are found in practice to sensibly attack or destroy ordinary textile fabrics as above explained. On the other hand, in many cases, the use of filter beds is impractical on account of the amount of suspended matter, the consequent rapid clogging of the filter, and the labor required to remove the dust from the filter, as compared with a bag where simple shaking accomplishes the result. Thus there remains a wide range of industrial gases for which we have, at present, no satisfactory means of mechanical filtration. It is to applications in this field that my present invention is chiefly directed; and to this end, my invention may be stated, briefly, to be a chemically resistant medium for filtering corrosive acid carrying gases, consisting of a fabric of vegetable fibers, which fabric has been subjected to a sufficient temperature for a length of time sufficient to convert its cellulose into products no longer appreciably attacked by acid; and my invention also consists in a novel process of producing said medium.

The deterioration and weakening of cotton and other vegetable fibers in acid gases appears to be chiefly due to the esterification and hydrolysis of the cellulose which is itself conditioned by the carbohydrate grouping of the body. It would seem probable that if these groups of the cellulose could be removed or broken down without too seriously disturbing the mechanical strength of the fibers, a fabric much more resistant to acids might be secured, and enough of the original tensile strength still retained to make it a practical filtrating medium. Following up this idea, my experiments have finally demonstrated that when cotton or other vegetable fabrics are gradually heated preferably out of contact with the air, they commence between 150° and 200° C. sensibly to decompose; but only gradually to decrease in tensile strength, and increase in brittleness as higher temperature is long continued. Parallel with the decrease in initial tensile strength goes, however, increased resistance to further weakening by acids. It has proved to be entirely practicable to carry the heat treatment of the fabrics to a degree where they are no longer sensibly affected by acids, and still have them retain sufficient tensile strength and flexibility to admirably fulfil their function as a filtering material.

As an example of the class of results which may be obtained the following is cited:—Samples of a cotton fabric weighing 350 grams per square meter and having a tensile strength of 2,300 kilos per meter were heated in a closed vessel to maximum temperatures of 300° to 340° C. for periods of from 10 minutes to 3 hours and after cooling in the closed vessel were found perfectly flexible and of a uniform very dark brown to jet black color. During the treatment the samples lost from 68 to 76% of their original weight and at the end showed tensile strengths of 30 to 85 kilos per meter. On boiling with various strengths of sulfuric acid they were found to stand, without sensible deterioration and without imparting any color to the acid, strengths of the acid varying from 50 to 64% and even at much higher concentrations the action was only slight, whereas the original cotton material when similarly treated was completely destroyed almost as soon as it touched the acid. If a piece of the fabric which had been given the heat treatment was heated strongly in a glass tube, pyroligneous material in very considerable quantity was given off from it, showing that the decomposition of the cellulose does not need to proceed to complete carbonizing in order to render it unattackable by acid. It seems probable that the compounds we here have to deal with are to some extent comparable with those of coal and asphalt. They are sometimes referred to in chemical literature as the "pseudo-carbons"; and, for the purpose of the present specification, may be conveniently distinguished from ordinary charcoal or true carbon, first, by their very considerable content of chemically combined hydrogen and oxygen, as shown by the volatile organic matter which distils off upon heating them up, out of contact with the air, to a red heat; second, by their vastly greater flexibility; and, third, by the entire absence of electrical conductivity.

The particular temperature and length of heating above mentioned are to be understood merely as illustrative, for I do not attempt in the present specification to strictly limit these variables, since they will naturally be varied to some extent in practice, depending upon the character of the raw vegetable fiber, and the particular conditions which the finished product must meet at the point where it is to be used. In general it may be said that the higher the temperature, the shorter the time required to reach a given state. Thus it has been found possible to prepare some quite satisfactory material with only a few minutes heating at temperatures between 300° and 350° C., while, on the other hand, by extending the time of heating to several days or a week, similar results have been obtained at temperatures between 200° and 250° C.

A fabric prepared as above described may, of course, be used as a filter in many different mechanical arrangements.

When possible, I prefer to use the fabric in the form of bags or tubes as in the well known bag-house construction above referred to. The bag is preferably woven in a single piece as such and subsequently given the heat treatment as above described.

After the above mentioned heat treatment, the fabric will no longer burn with a flame, but on being ignited will slowly smolder. When operating on gases carrying moderate quantities of suspended particles of free sulfuric acid, a portion of this soon coats the fibers without appreciably matting them, and greatly reduces the danger of ignition by sparks.

When desired the fabric may be impregnated with acid or other fire proofing material before use.

Having thus described my invention what I claim as new and desire to secure by Letters Patent is:—

1. A filtering medium, consisting of a fabric of vegetable fibers, which has been subjected to a sufficient temperature for a sufficient time to convert its cellulose into products no longer appreciably attacked by acid.

2. A filtering medium, consisting of a woven fabric of vegetable fibers which has been subjected to such a degree and duration of heat as to convert its cellulose into products no longer appreciably attacked by the corrosive gases to be filtered, without, however, destroying its mechanical structure or too greatly reducing its tensile strength and flexibility.

3. As a filtering medium, a woven fabric of vegetable fibers which has been subjected to such a degree and duration of heat as to convert its cellulose into pseudo-carbons, substantially as above described.

4. The process of preparing a pliable fabric to resist the chemical action of corrosive substances, which consists in heating a woven fabric of vegetable fibers to a sufficient temperature for a sufficient time to convert its cellulose into pliable, acid-resisting pseudo-carbons.

In testimony whereof I have signed my name to this specification in the presence of two subscribing witnesses.

FREDERICK GARDNER COTTRELL.

Witnesses:
WM. F. BOOTH,
D. B. RICHARDS.